Patented Jan. 15, 1924.

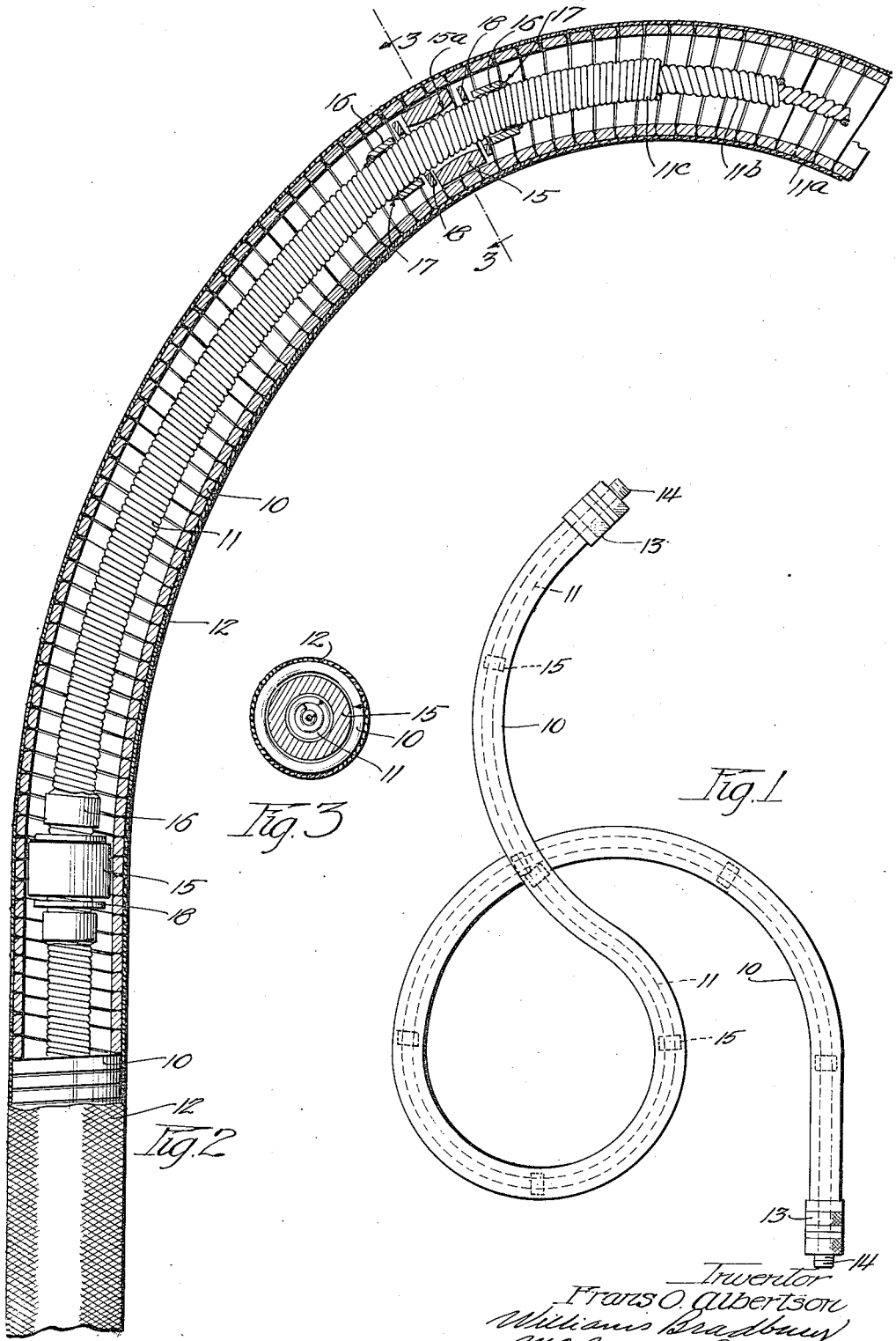

1,481,078

UNITED STATES PATENT OFFICE.

FRANS O. ALBERTSON, OF SIOUX CITY, IOWA, ASSIGNOR TO ALBERTSON & COMPANY, OF SIOUX CITY, IOWA, A CORPORATION OF IOWA.

FLEXIBLE SHAFTING.

Application filed November 24, 1922. Serial No. 603,089.

*To all whom it may concern:*

Be it known that I, FRANS O. ALBERTSON, a citizen of the United States, and resident of Sioux City, in the county of Woodbury and State of Iowa, have invented a certain new and useful Improvement in Flexible Shafting, of which the following is a full, clear, concise, and exact description, reference being had to the accompanying drawings, forming a part of this specification.

My invention relates to flexible shafting, and especially to flexible shafting consisting of a flexible "live" shaft of coiled wire which rotates within a flexible tubular casing, and used for the purpose of transmitting power.

One object of my invention is to provide flexible shafting wherein all the advantages of elasticity and flexibility of torque in the driving member are retained, but wherein any danger of buckling is prevented.

Another object of my invention is to concentrate substantially all the wear between the rotating and non-rotating parts of such flexible shafting upon a member of softer metal than that of the live shaft or casing, the utility of this member not being impaired by wear within reasonable limits.

A still further object of my invention is to provide such flexible shafting wherein the friction between the moving and non-moving elements is concentrated at and reduced by an anti-friction member.

Other objects and advantages of my invention will appear in the progress of the following description, wherein reference is made to the accompanying drawings showing an embodiment of my invention, wherein—

Figure 1 is a diagrammatic plan view of the shafting of my invention;

Figure 2 is an enlarged detail for the most part in longitudinal section showing the inner construction of the shafting, and Figure 3 is a transverse section taken upon the line 3—3 of Figure 2.

Similar characters of reference will be used for referring to similar parts throughout the several views.

The flexible shafting of my invention comprises in general a casing 10 of flexible metallic tubing within which is rotatably positioned the live flexible shaft 11. The casing here shown is formed from a continuous tubular helix of flattened wire, and is preferably covered with an elastic woven wire sheath 12. The ends of the casing are provided with suitable coupling members 13, within which are supported the terminal studs 14 secured to the ends of the flexible shaft 11 by means of which the driving and driven elements are connected to the shaft.

The shaft 11, as shown in Figures 2 and 3, is built up from a plurality of continuous concentric helixes $11^a$, $11^b$ and $11^c$, which give (as is well known) the shaft the properties of a universal joint at any point throughout its length. A plurality of sleeves or annular rollers 15 are slipped over the shaft 11, and positioned at spaced intervals there and positioned at spaced intervals there along, as indicated in Figure 1. These rollers 15 are somewhat smaller than the inner diameter of the casing 10, while the bores of the rollers are slightly larger than the diameter of the shaft 11 and are preferably, though not necessarily, flared outwardly toward the ends, as indicated at $15^a$.

A pair of collars 16—16 is spaced adjacent each roller 15, one collar on each side thereof, the collars being secured to the outer coil $11^c$ of the flexible shaft by means of solder, indicated at 17, or by other suitable means. These spaced collars 16—16 act to limit the movement of the rollers 15 longitudinally of the flexible shaft. As the adjacent ends of the collars 16 in each pair are not parallel when the flexible shaft is bent, I have provided washers 18 between each roller 15, and its adjacent collars, so that when the shaft is rotated in a flexed position of the shafting the end of each collar will make a rolling contact with the adjacent face of the washer 18, while the opposite face of the washer will make a flat contact with the adjacent end of a roller 15, thereby minimizing friction and wear.

It will be seen that by means of the several rollers 15 the flexible shaft 11 is positioned centrally of the casing at points adjacent the rollers, and that between the rollers the shaft is sufficiently stiff to support itself in a substantially central position, whereby practically all the wear between the moving and non-moving parts of the shafting is concentrated at the several rollers 15. I prefer to make the roller 15 of bronze, brass, or other metal softer than the metal in the flexible metallic casing 10, and likewise softer than the wire of the flexible shaft 11, so that any wear which does occur will be on the roller rather than on the casing or the shaft. It is apparent that a very considerable wearing away of the metal of the roller can take place without impairing its utility in preventing direct wear between the shaft 11 and the casing 10, and in preventing buckling of the flexible shaft, as later described.

By thus journaling the flexible shaft 11 centrally of the casing at spaced points throughout the length of the shafting, any danger of the buckling of the shaft 11 within reasonable torque strains is prevented, because a buckling of the shaft could take place only when the shaft itself assumes a helical position within its casing.

I have found that in the work for which the flexible shafting of my invention is peculiarly adaptable—such as the driving of metal working tools in the repair of automobiles and the like, wherein work must be done at places accessible with difficulty—it is especially desirable to provide shafting which will operate in extremely flexed positions, that is, where the radius of the curve of the shafting is comparatively small, without substantial increase of friction. Because of its construction from helical coils, the flexible shaft 11 as a whole has a certain longitudinal elasticity. Hence, when the casing 10 is bent beyond a certain degree, the convolutions of the wire forming the casing contact along a line adjacent the center of the arc which the casing has assumed, and beyond this degree of bending the convolutions of the casing can no longer collapse with the result that the length of the center of the casing increases. In such a case, did the flexible shaft allow no longitudinal stretch the shaft would tend to straighten itself between the spaced rollers 15 and would cause an excessive friction directly between the casing and the flexible shaft. But in the construction here shown, the resistance to flexure of the flexible shaft is great enough in comparison to its resistance to longitudinal stretch to hold the flexible shafting approximately at the center of the casing or at least a sufficient distance away from the casing to prevent substantial friction therebetween.

While I have described the specific embodiment of my invention, I contemplate that certain changes may be made without departing from the spirit of my invention.

What I claim is:

1. The combination of a flexible metallic tubing, a continuous flexible shaft, said tubing constituting a casing within which said shaft rotates, rollers encircling said shaft and loosely mounted thereon, said rollers being spaced at intervals along said shaft, a pair of collars suitably secured to said shaft adjacent each of said rollers and serving to limit longitudinal movement of said roller, and washers interposed between said rollers and said adjacent collars.

2. The combination of a flexible metallic tubing, a continuous flexible shaft, said tubing constituting a casing within which said shaft rotates, rollers encircling said shaft and loosely mounted thereon, said rollers being spaced at intervals along said shaft, a pair of collars secured to said shaft adjacent each of said rollers and serving to limit longitudinal movement of the roller, and washers interposed between said rollers and said adjacent collars and loosely mounted on the shaft, whereby when the shaft is rotated in a flexed position of the shafting the end of each collar will make a rolling contact with the adjacent face of a washer while the opposite face of said washer will make a flat contact with the adjacent end of a roller.

3. The combination of a flexible metallic tubing, a continuous flexible shaft, said tubing constituting a casing within which said shaft rotates, rollers encircling said shaft and loosely mounted thereon, said rollers being spaced at intervals along said shaft, the bores of the rollers being flared outwardly toward the opposite ends of the rollers, a pair of collars secured to said shaft adjacent each of said rollers and serving to limit longitudinal movement of said roller, and washers interposed between said rollers and said adjacent collars.

In witness whereof, I hereunto subscribe my name this 20th day of November, 1922.

FRANS O. ALBERTSON.

Witnesses:
A. M. ANDERSON,
P. J. AUST.